United States Patent [19]

Iwahashi et al.

[11] Patent Number: 5,007,101
[45] Date of Patent: Apr. 9, 1991

[54] AUTO-CORRELATION CIRCUIT FOR USE IN PATTERN RECOGNITION

[75] Inventors: Hiroyuki Iwahashi, Nara; Yoshiki Nishioka, Tenri; Mitsuhiro Hakaridani, Nara, all of Japan

[73] Assignee: Sharp Kabushiki Kaisha, Japan

[21] Appl. No.: 454,022

[22] Filed: Dec. 28, 1982

[30] Foreign Application Priority Data

Dec. 29, 1981 [JP] Japan .................. 56-210296

[51] Int. Cl.⁵ .................................. G06K 9/36
[52] U.S. Cl. .......................... 382/42; 364/728.05; 364/728.07; 381/42; 382/1; 382/34
[58] Field of Search ........... 364/819, 820, 728, 728.05, 364/728.07, 728.03; 382/34, 42, 1; 381/42

[56] References Cited

U.S. PATENT DOCUMENTS 4,282,406  8/1981  Yato et al. .................. 381/49
4,301,329  11/1981  Taguchi .................... 381/37

Primary Examiner—Leo H. Boudreau

[57] ABSTRACT

An auto-correlation unit for pattern recognition to obtain auto-correlation functions as for sampled signals is disclosed N pieces of sample values $X_n$ (n=0 to N-1)are extracted from a series of the sample values expressed with an accuracy of optional multi-bits and the auto-correlation coefficients of these N pieces of the sample values obtained. The sum of sample values $X_n$ and $X_{n-\tau}$ ($\tau$=0 to P) are calculated. The squared value $(X_n + X_{n-\tau})^2$ of the added results is previously memorized in a ROM while being addressed by the resultant sum. The auto-correlation coefficients are available by feeding the output $(X_n + X_{n-\tau})^2$ of the ROM and executing calculation as defined by the following equation:

$$\sum_{n=0}^{N-1} [X_n + X_{n-\tau}]^2/2 \cdot \sum_{n=0}^{N-1} X_n^2 - 1$$

1 Claim, 3 Drawing Sheets

| ROM address | | | ROM output |
|---|---|---|---|
| $A_2$ | $A_0$ | $A_{10} \sim A_2$ | |
| 0 | 0 | $X_n + X_{n-\tau}$ and Carry | $Y_7 \sim Y_0$ |
| 0 | 1 | | $Y_{15} \sim Y_8$ |
| 1 | 0 | | $Y_{23} \sim Y_{16}$ |

AUTO-CORRELATION CIRCUIT FOR USE IN PATTERN RECOGNITION

BACKGROUND OF THE INVENTION

This invention relates to an auto-correlation unit for use in pattern recognition to obtain auto-correlation coefficients as for stored signal samples.

Auto-correlation coefficient $C_\tau$ used in pattern recognition for voice recognition can generally be obtained by the following equation:

$$C_\tau = \sum_{n=0}^{N-1} X_n \cdot X_{n-\tau} \bigg/ \sum_{n=0}^{N-1} X_n \cdot X_n$$

$$(\tau = 0, 1, \ldots, P)$$

where $\tau$ indicates the degree of the auto-correlation coefficient sought to be calculated.

Conventional auto-correlation units for voice recognition are comprised of a multiplier and an adder. The multiplication items in the above equation are calculated and $\tau$ pieces of the auto-correlation coefficients are calculated by adding these results in the adder in order to obtain the cumulative sum thereof.

Those state-of-the-art units for calculation of the auto-correlation coefficients have the disadvantage of requiring expensive multipliers and also complicated circuitry. As a result the auto-correlation unit circuitry within the entire pattern recognition apparatus is proportionately large and auto-correlation calculation demands a greater amount of time during recognition.

SUMMARY OF THE INVENTION

The principal object of this invention is to provide an auto-correlation unit for pattern recognition which evaluates auto-correlation coefficients by means of a simple circuitry without the need for an expensive multiplier as well as eliminating the above discussed disadvantages.

Another object of this invention is to provide circuitry for calculation of approximate auto-correlation coefficients by squaring the sum of $X_i$ and $X_{i-\tau}$ without a multiplier where $X_i$, $X_{i-\tau}$ are stored signal samples.

To attain the above objectives, the auto-correlation unit for pattern recognition according to this invention is adapted to extract N pieces of sample values $X_n$ ($n = 0$ to $N-1$) from a series of sample values expressed with an accuracy of optional multiple bits. In securing the auto-correlation coefficients as for N pieces of the sample values, an addition means is used to evaluate the sum of the sample values $X_n$ and $X_{n-\tau}$ ($\tau = 0$ to $P$) and then a ROM (read only memory) becomes operative to memorize the squares of the sum, $(X_n + X_{n-\tau})^2$, while being addressed by the results of the additions. Finally, using the output of the ROM, $(X_n + X_{n-\tau})^2$, the auto-correlation coefficients are evaluated as follows:

$$\sum_{n=0}^{N-1} [X_n + X_{n-\tau}]^2/2 \cdot \sum_{n=0}^{N-1} X_n^2 - 1$$

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
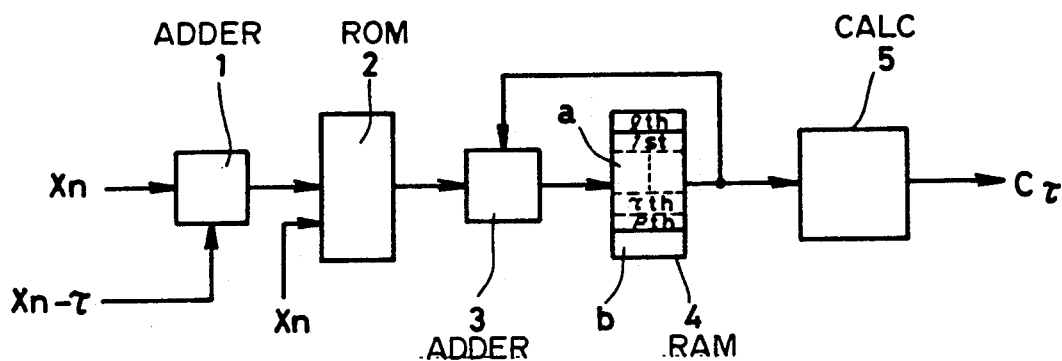
FIG. 1 is a block diagram schematically showing an embodiment of this invention.

An auto-correlation function $R_\tau$ as for discrete input signals $X_n$ (sample values) can generally be expressed as follows:

$$R_\tau = \frac{1}{N} \cdot \sum_{n=0}^{N-1} X_n \cdot X_{n-\tau} \quad (1)$$

$$(\tau = 0, 1, 2, \ldots, P)$$

If we normalize the input signals with the auto-correlation function R when $\tau = 0$, the auto-correlation coefficient $C_\tau$ can be represented:

$$C_\tau = \frac{R_\tau}{R_0} = \sum_{n=0}^{N-1} X_n \cdot X_{n-\tau} \bigg/ \sum_{n=0}^{N-1} X_n^2 \quad (2)$$

$$(\tau = 0, 1, 2, \ldots, P)$$

Considering $R_\tau'$ represented in terms of the square of the sum of $X_n$ and $X_{n-\tau}$, $$R_\tau' = \frac{1}{N} \sum_{n=0}^{N-1} [X_n + X_{n-\tau}]^2 \quad (3)$$

$$= \frac{1}{N} \sum_{n=0}^{N-1} X_n^2 + 2 \cdot \frac{1}{N} \sum_{n=0}^{N-1} X_n \cdot X_{n-\tau} + \frac{1}{N} \sum_{n=0}^{N-1} X_{n-\tau}^2 \quad (3)'$$

$$(\tau = 0, 1, 2, \ldots, P)$$

Because the difference between the first and third items is very small if $N \gg P$, reasonably good approximation of the auto-correlation coefficient is available as follows:

$$\frac{1}{N} \sum_{n=0}^{N-1} X_{n-\tau}^2 \approx \frac{1}{N} \sum_{n=0}^{N-1} X_n^2$$

The above equation (3)' can be rewritten:

$$R_\tau' = 2 \left( \frac{1}{N} \sum_{n=0}^{N-1} X_n^2 + \frac{1}{N} \sum_{n=0}^{N-1} X_n \cdot X_{n-\tau} \right) \quad (4)$$

$$(\tau = 0, 1, 2, \ldots, P)$$

Equation (4) can be rewritten as follows, using the auto-correlation functions $R_0$ and R:

$$R_\tau' = 2 \left( \frac{1}{N} \sum_{n=0}^{N-1} X_n^2 + \frac{1}{N} \sum_{n=0}^{N-1} X_n \cdot X_{n-\tau} \right) \quad (5)$$

$$= 2(R_0 + R_\tau)$$

$$(\tau = 0, 1, 2, \ldots, P)$$

Equation (6) is available from equation (3)

$$R_0' = 4R_0 \quad (6)$$

Equation (7) is available from equations (5) and (6)

$$\frac{R_\tau'}{R_0'} = \frac{2(R_0 + R_\tau)}{4R_0} \quad (7)$$

Equation (7) can be rewritten into equation (8):

$$\frac{R_\tau}{R_0} = 2 \cdot \frac{R_\tau'}{R_0'} - 1 \quad (8)$$

Substituting equations (3) and (6) into equation (8), $$\frac{R_\tau}{R_0} = 2 \cdot \frac{1}{N} \sum_{n=0}^{N-1} [X_n + X_{n-\tau}]^2/4 \cdot \frac{1}{N} \sum_{n=0}^{N-1} X_n^2 - 1$$
$$= \sum_{n=0}^{N-1} [X_n + X_{n-\tau}]^2/2 \cdot \sum_{n=0}^{N-1} X_n^2 - 1 \quad (9)$$

$$(\tau = 0, 1, 2, \ldots, P)$$

Equation (9) reveals that the approximated value of the auto-correlation coefficient becomes available by squaring the sum of the input samples.

The following will describe in detail the way by which to calculate the auto-correlation coefficients according to equation (9), pursuant to the principle of the present invention.

In FIG. 1, an adder 1 is provided which adds sample values $X_n$ and $X_{n-\tau}$ expressed with an accuracy of optional multiple bits (e.g. 8 bit) and the output (maximum: 9 bits) of the adder 1 is fed to a ROM 2 (read only memory) in the next stage as an address signal for the ROM 2. The memory ROM 2 is designed so that the square of 18 bits can be delivered upon receipt of the 9 bit input signal, while being addressed by the value $(X_n + X_{n-\tau})$ from the adder 1. An adder 3 is further provided which repeats (n) times addition of the squared value from the ROM 2 with the memory contents of the RAM 4, in which the previous accumulated results are memorized. The results $(X_n + X_{n-\tau})^2$ is finally stored in a region "a" of memory 4.

Similarly, $X_n$ is applied as address signals for the ROM 2 and the squared value $X_n^2$ is fetched from the ROM 2. This value is cumulatively added (n=0 to N−1) and the result $X_n^2$ is memorized in a region "b" of the memory 4.

A calculation unit 5 is provided to calculate the auto-correlation coefficient C by executing operations according to equation (9), based on the following squared cumulative values memorized in memory 4:

$$\sum_{n=0}^{N-1} (X_n + X_{n-\tau})^2 \quad \text{and} \quad \sum_{n=0}^{N-1} X_n^2$$

The contents read out from the region "b" of the memory 4 are doubled and divided by (P+1) pieces of the values read out from the region "b" of the memory 4 and subtraction of "1" is effected on the results of such division. This results in evaluating (P+1) pieces of the auto-correlation functions $C_\tau(\tau=0,1,\ldots P)$.

In the foregoing manner, the auto-correlation coefficients used as feature parameters in pattern recognition of voice recognition systems can be approximately obtained by simple circuitry which is generally set up by the adder, the ROM and the one or more RAM's.

Figure 2:
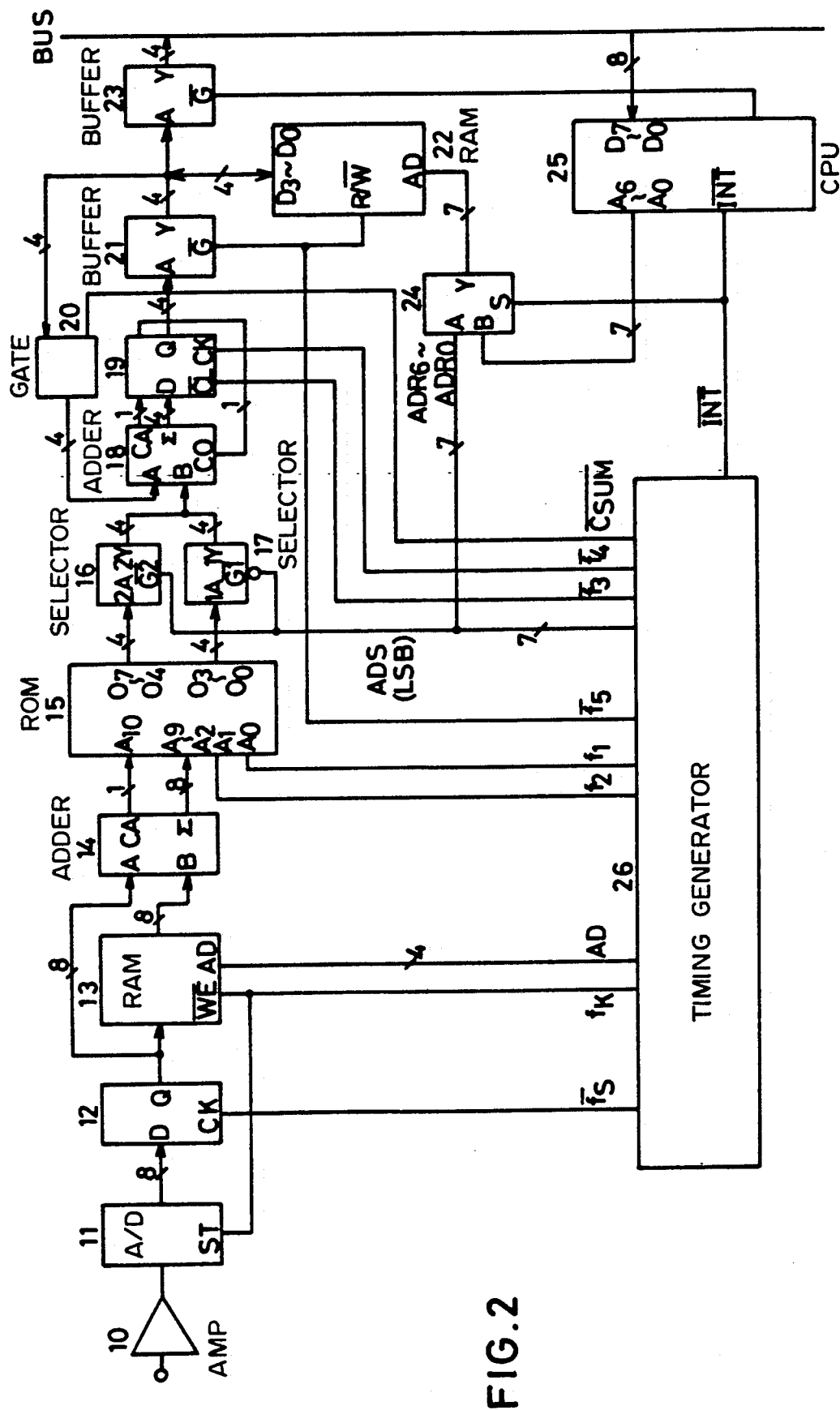
FIG. 2 is a block diagram showing in more detail the embodiment of this invention.

FIG. 2 shows details of the auto-correlation unit as shown in FIG. 1. This circuit generally includes an amplifier, an analog to digital converter, a ROM and RAM's, a central processing unit CPU for executing of approximation of the correlation coefficient and a timing generator for generation of various timing signals.

Figure 3:
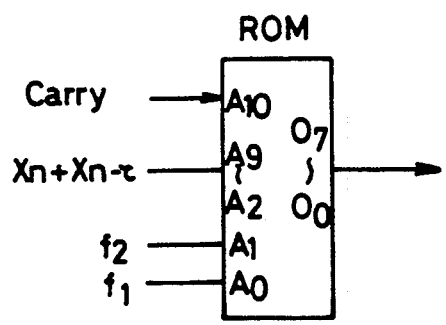
FIG. 3 is an illustration of the input-to-output relation of a ROM in the arrangement as shown in FIG. 2.

An analog signal (voice input) is amplified via the amplifier 10 and converted into an 8-bit binary offset code signal via the converter 11. $\overline{f_s}$ provides a start pulse to the analog to digital converter and a write pulse for the RAM 13. The resultant signal $X_n$ is held in a latch 12 responsive to $f_k$ and loaded into the RAM 13, while providing an A input to an adder 14 (corresponding to the adder 1 in FIG. 1). The RAM 13 is to store $X_{n-\tau}$ which in turn is outputted data $X_{n-\tau}$ with a delay $\tau$ in response to an address AD specified from the timing generator. Because of AD being 4 bits long, the RAM 13 is capable of storing data up to $X_{n-15}$. The output of the RAM 13 is also 8 bits and fed to a B input to the adder 14 which in turn adds the latter to the A input thereof and results in $X_n + X_{n-\tau}$. The result of scu addition or the sum $X_n + X_{n-\tau}$ is 9 bits including a carry bit. The ROM 15 is accessed by the resulting 9 bit output to fetch $(X_n + X_{n-\tau})^2$ which is previously stored therein. The reason why $X_n + X_{n-\tau}$ is stored in addresses $A_{10}$-$A_2$ of the ROM is due to the facts that $(X_n + X_{n-\tau})^2$ consists of 32 bits and is divided into 4 groups in outputting the same. For such grouping signals $f_1$ and $f_2$ are fed from the timing generator to $A_0$ and $A_1$. The above procedure offers calculation of $(X_n + X_{n-\tau})^2$. Because of the upper 8 bits of $(X_n + X_{n-\tau})^2$ being constantly "0", calculation of $\Sigma (X_n + X_{n-\tau})^2$ is effected on only 24 bits while ignoring the upper 8 bits (see FIG. 3).

The following describes a calculation circuit for evaluating $\Sigma (X_n + X_{n-\tau})^2$, which circuit includes selectors 16 and 17, an adder 18, the RAM 22, buffers 21 and 23 and a clear gate 20. For simplicity of circuit design, the 8 bit output of the ROM 15 is further divided into two groups and addition is effected every 4 bits in evaluating $\Sigma (X_n + X_{n-\tau})^2$. The selectors $S_1$ and $S_2$ decide if signals under processing are the upper 4 bits or lower 4 bits of the 8 bit output of the ROM as selected by the least significant bit of the address ADS of the RAM 22. The address ADS is established through the timing generator 26.

The sequence will be now discussed in which $\Sigma (X_n + X_{n-\tau})^2$. The signals $s_1$ and $s_2$ are initially 00, addressing the lower 8 bits of $(X_n + X_{n-\tau})^2$. The output of the ROM is $Y_7$-$Y_0$. At this moment the least significant bit of ADS selects the lower 4 bits so that $Y_2$-$Y_0$ are fed to the B input of the adder 18 which also receives at its A input the lower 4 bits of $\Sigma (X_n + X_{n-\tau})^2$ currently fed from the RAM 22 through operation of the timing generator. The adder 18 seeks the sum of both the lower 4 bits and the results of such addition including a carry CA is held at a latch 19 in response to $\overline{f_4}$. CA is the carry for the following 4 bit addition and CO is a carry originating during the lower 4 bit addition. The latter need be "0" during the lower 4 bit addition and this demand is satisfied by $\overline{f_3}$ from the timing generator. The results of calculation held by the latch 19 except the carry are loaded into the RAM 22. The buffer 21 is of a tristate type and shows a high impedance except during writing of the RAM 22. This timing requirement is determined by $\overline{f_5}$.

Upon completion of the lower 4 bit calculation the address ADS of the RAM 22 is updated with the lowest bit thereof selecting the upper 4 bits. The upper 4 bit calculation is carried out in the same timed manner as with the lower 4 bit calculation. Calculation on the outputs $Y_7$-$Y_0$ of the ROM is completed in this manner. Thereafter, $f_1$ and $f_2$ become "10" so that calculation proceeds in the order of the lower 4 bits and upper 4 bits with the result $\Sigma\ (X_n+X_{n-\tau})^2$ being placed into the RAM 22. This is true when $f_1$, $f_2$ are "01." Through the above routine of operations $\Sigma\ (X_n+X_{n-\tau})^2$ is calculated (n) times and the results of such calculations are written into the RAM 22.

Once $\Sigma^N(X_n+X_{n-\tau})^2$ has been evaluated, the timing generator informs the CPU of the end of calculation and at the same time renders $S_3$ operative so that the RAM 22 is accessible from the CPU. This is achieved with a signal $\overline{INT}$ from the timing generator. That is, the CPU is interrupted by the signal $\overline{INT}$ and fetches $\Sigma^N(X_n+X_{n-\tau})^2$ from the RAM 22. Because only the lower 4 bits of the resultant data are in effect, data matching is necessary. The correlation coefficient is obtained under the approximation as defined by equation (9).

During the interruption period $\overline{C_{SUM}}=0$ in the timing generator and the output from the RAM 22 is cleared via the gate to secure $\Sigma\ (X_n+X_{n-\tau})^2$. The unit is therefore ready to calculate $\Sigma\ (X_n+X_{n-\tau})^2$. The CPU should pick up the correlation coefficient from the RAM 22 during the period where $\overline{INT}=0$.

Figure 4:
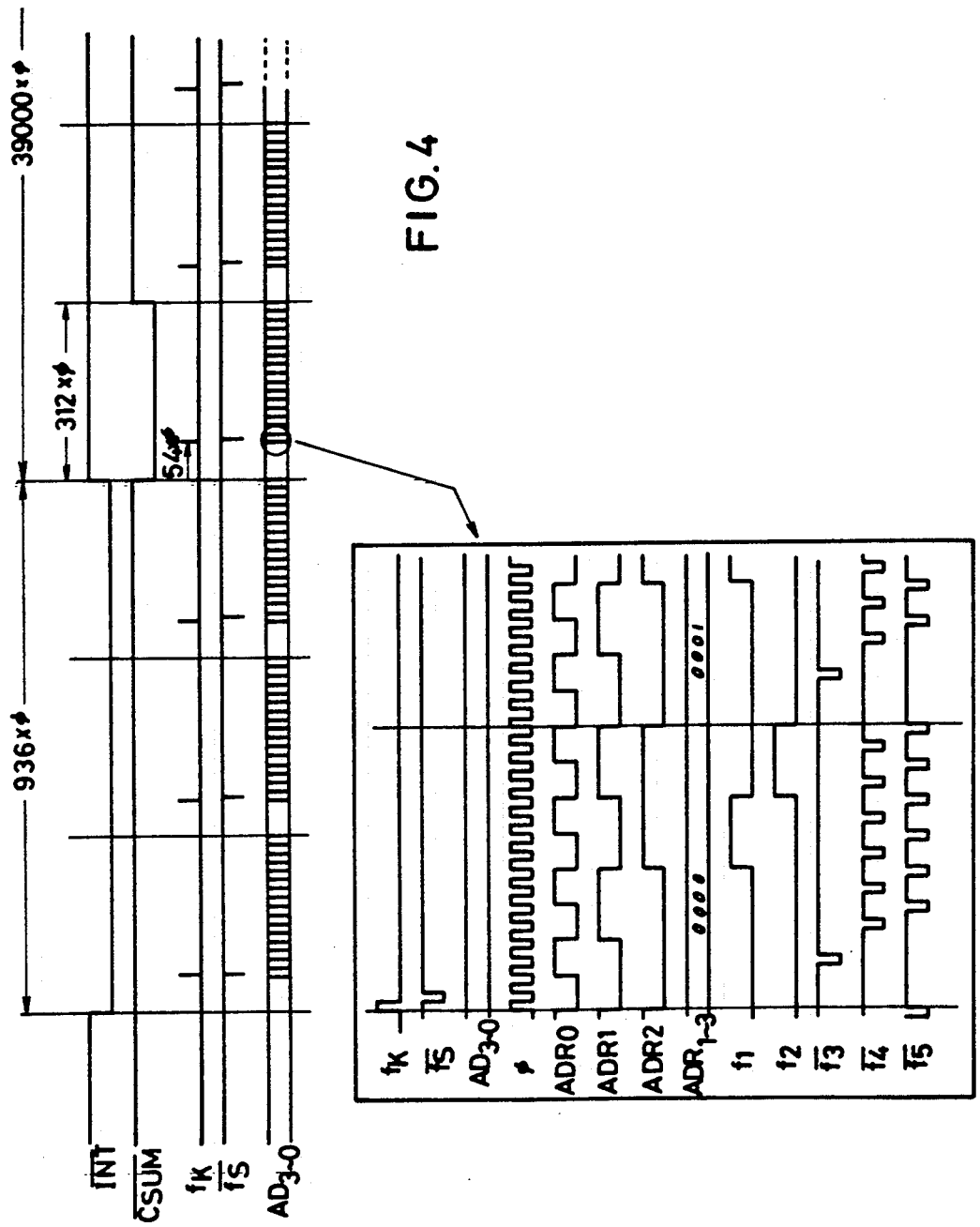
FIG. 4 is a time chart of operation of the auto-correlation unit of FIG. 2.

In FIG. 4, $\phi$ is a basic clock of 2.5 MHz (a pulse width of 200 ns). $AD_3$-$AD_0$ are decremented at the start of each time frame and then incremented sequentially in the above manner. $\overline{f_k}$ and $\overline{f_s}$ have a pulse width of 200 ns and a frequency of 8 KHz. $ADR_6$-$ADR_3$ are sequentially incremented as is clear from FIG. 4. $\overline{f_4}$ and $\overline{f_5}$ are not developed while $\overline{INT}$ is active.

As explained in the foregoing, this invention offers a highly cost effective auto-correlation unit for pattern recognition with simple circuitry without the need to use an expensive multiplier, but which has comparatively high accuracy and can, moreover, calculate autocorrelation coefficients at high speed.

What is claimed is:

1. An auto-correlation unit for providing auto-correlation coefficients for use as feature parameters in pattern recognition for N pieces of sampled input values $X_n$ (n=0 to N−1), said unit comprising:

means for extracting N pieces of sample input values $X_n$ from a series of sample values in an input pattern expressed with an accuracy of optional multi-bits;

means for calculating the sum of the sample values $X_n$ and $X_{n-\tau}(\tau=0$-P, $P\leqq N)$;

a read only memory associated with said means for calculating;

means for feeding to said read only memory the sum of the sampled input values as an address signal;

means for storing in said read only memory the squared value of each sum, $(X_n+X_{n-\tau})^2$;

means for fetching and outputting the squared values of each such sum of the sample input values from said read only memory when said memory is addressed by the sum of the sample input values; and means responsive to the output $(X_n+X_{n-\tau})^2$ of said read only memory for providing an auto-correlation coefficient for use as a feature parameter according to the following formula:

$$\sum_{n=0}^{N-1} [X_n + X_{n-\tau}]^2/2 \cdot \sum_{n=0}^{N-1} X_n^2 - 1$$

* * * * *